United States Patent [19]

Ducournau et al.

[11] Patent Number: 4,527,476
[45] Date of Patent: Jul. 9, 1985

[54] INKING MECHANISM FOR A PRINTING PRESS

[75] Inventors: Alain Ducournau, Basse Goulaine; François Barras, Chapelle sur Erdre, both of France

[73] Assignee: Creusot-Loire, Paris, France

[21] Appl. No.: 493,491

[22] Filed: May 11, 1983

[30] Foreign Application Priority Data

Jun. 4, 1982 [FR] France .................... 82 09773

[51] Int. Cl.³ .................................. B41F 31/30
[52] U.S. Cl. .................................. 101/352; 101/351
[58] Field of Search ............... 101/351, 352, 218, 247, 101/182, 184, 185, 192, 209, 137, 139, 140, 143, 144, 145, 148, 323

[56] References Cited

U.S. PATENT DOCUMENTS

| | | | |
|---|---|---|---|
| 2,166,271 | 7/1939 | Storck | 101/351 |
| 2,570,242 | 10/1951 | James | 101/145 |
| 2,703,525 | 3/1955 | Stempel | 101/148 |
| 3,507,215 | 4/1970 | Schuhmann | 101/351 X |

Primary Examiner—Edgar S. Burr
Assistant Examiner—Charles A. Pearson
Attorney, Agent, or Firm—Pollock, Vande Sande & Priddy

[57] ABSTRACT

An improvement in printing presses in which at least one inking roller is placed in rolling contact with two other rollers, one of which is a slide table, this inking roller being mounted pivotally about the axis of rotation of the slide table. The inking roller (4, 5) is mounted rotatably about a shaft (15), the corresponding slide table (3) is supported by two fixed bearings (18, 19) each comprising a cylindrical outer face (20, 21), each end (22, 23) of the shaft (15) of the inking roller (4, 5) is connected to each corresponding fixed bearing (18, 19) through the intermediary of a flexible metal band (28, 29) bent in U shape, the central region of which partly surrounds the cylindrical face of the fixed bearing, being fixed thereto, and the two ends of which are fixed to the ends (22, 23) of the shaft (15) of the inking roller.

4 Claims, 2 Drawing Figures

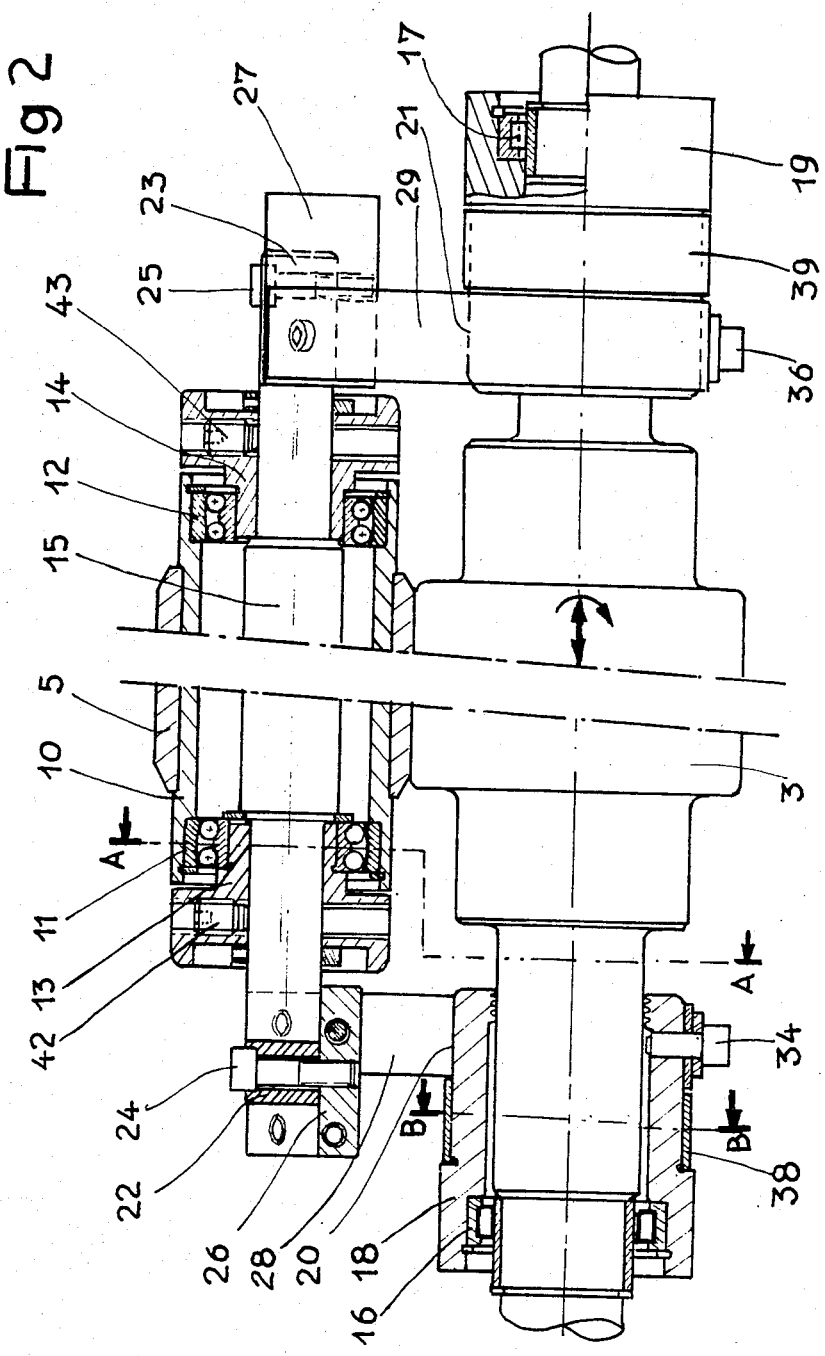

INKING MECHANISM FOR A PRINTING PRESS

FIELD OF THE INVENTION

This invention relates to an inking mechanism of a printing press.

BACKGROUND OF THE INVENTION

In a rotary printing press, the inking of the plate cylinder is effected, from an ink duct, through the intermediary of a series of rollers turning in mutual contact. Some of these rollers may also execute a reciprocating movement along their axis of rotation, and in this case are called "slide tables". The other intermediate rollers are called "inking rollers". Each inking roller is therefore in contact with two other cylinders, and these cylinders may be either the ink take-up roller, or the slide tables, or the plate cylinder. During the operation of the press, the force with which each inking roller comes into contact with the other cylinders must be monitored precisely. During shutdown of the machine, it is possible under these conditions for a marking of the rollers or of the plate cylinder at the level of the corresponding contact generatrices to occur. To overcome this disadvantage, devices have already been proposed which permit the movement of the axis of each inking roller in order to move the inking roller away from at least one of the two rollers with which it normally comes into contact, during shutdown of the machine.

One such known device, which permits such a movement of the inking roller, consists in mounting the inking roller pivotally about the axis of rotation of the slide table with which it is in contact. The inking roller is then mounted at each end, through the intermediary of rotary bearings, on a solid rigid piece itself mounted rotatably about the fixed bearing of the corresponding slide table.

It will be appreciated that such a mechanical assembly comprises a large number of rigid and solid pieces, difficult to machine and consequently costly. On the other hand, since the length of the rollers is considerable, there is a danger that the pivoting of the two pieces arranged at the two ends will not be perfectly simultaneous, thus involving a danger of the mechanical assembly jamming. On the other hand, these pivoting pieces must be well adjusted on the fixed bearings in order to prevent the longitudinal movements of the rollers entrained by the reciprocating movements of the table, and in this case fouling of the joints of the pivoting pieces by ink and danger of jamming rapidly occurs.

SUMMARY OF THE INVENTION

The invention therefore relates to an improvement in printing presses in which at least one inking roller is placed in rolling contact with two other rollers of which one is formed by a slide table, this inking roller being mounted pivotally about the axis of rotation of the corresponding slide table.

According to an essential feature of the invention, the inking roller is mounted rotatably about a shaft, the corresponding slide table is supported by two fixed bearings each comprising a cylindrical outer surface, each end of the shaft of the inking roller is connected to each corresponding fixed bearing through the intermediary of a flexible metal band bent in U shape, the central region of which partly surrounds the cylindrical outer face of the fixed bearing, and the two ends of which are fixed to the ends of the shaft of the inking roller.

BRIEF DESCRIPTION OF THE DRAWINGS

Further features and advantages of the invention will appear from the following detailed description of an exemplary embodiment, illustrated by the accompanying drawings, wherein:

FIG. 2 shows the same device in longitudinal section through C—C.

DESCRIPTION OF PREFERRED EMBODIMENT

Figure 1:
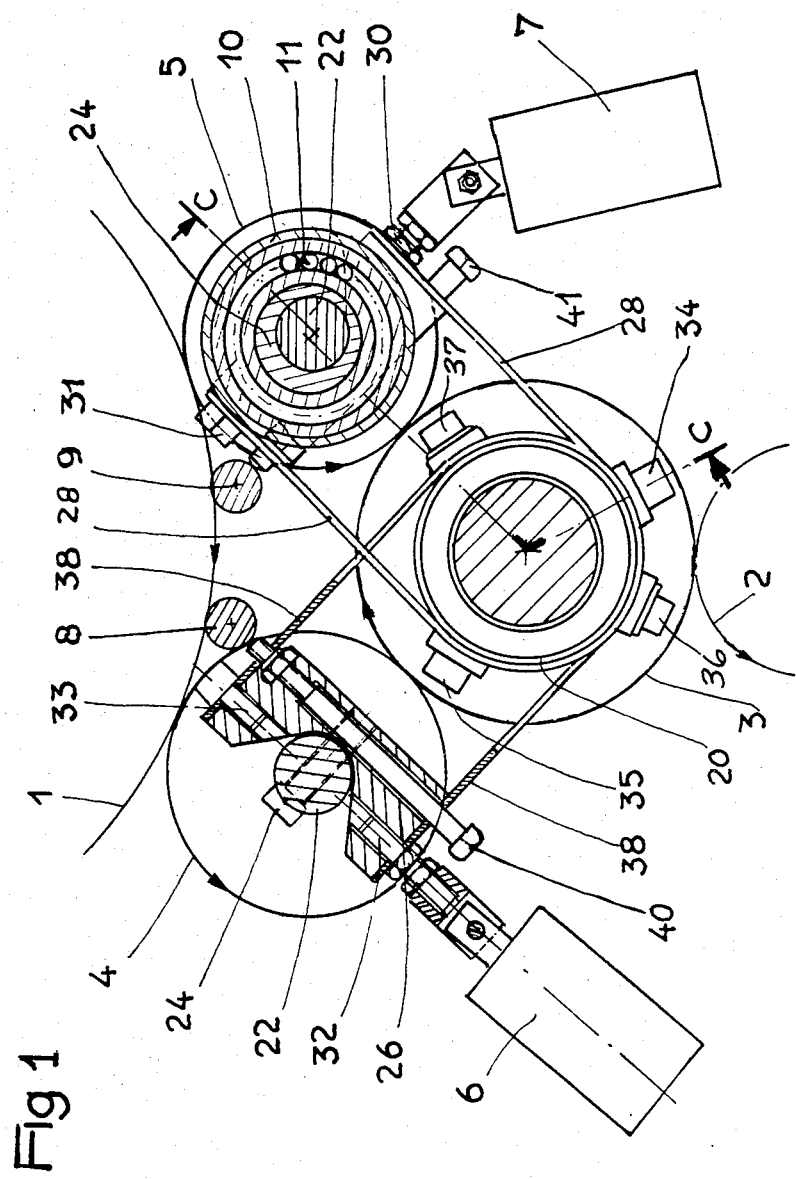
FIG. 1 shows the pivoting device according to the invention in partial cross-sections A—A and B—B.

FIG. 1 shows a number of rollers forming part of the roller assembly intended for inking the plate cylinder 1. More specifically, the figure shows diagrammatically a transmitter roller 2 in contact with a slide table 3, itself in contact with two inking rollers 4 and 5, these inking rollers being themselves in contact with the plate cylinder 1. The slide table 3 rotates with the various rollers 2, 4 and 5 and executes at the same time a reciprocating longitudinal movement in order to improve the uniformity of the ink layer deposited upon the plate cylinder. During the operation of the printing press, the inking rollers 4 and 5 are in contact simultaneously with the slide table 3 and the plate cylinder 1. During a shutdown of the machine, it is preferable to eliminate all contact between the rollers and the plate cylinder 1. To do this, the rollers 4 and 5 are mounted pivotally about the axis of rotation of the slide table 3. Pneumatic jacks 6 and 7 effect the pivotal movement of the rollers 4 and 5. During the operation of the press, the pistons 6 and 7 exert an action upon the rollers 4 and 5 in order to move them towards the plate cylinder 1; however, the movement is limited by the stops 8 and 9. During shutdown of the machine, the jacks 6 and 7 are actuated in the opposite direction in order to move the rollers 4 and 5 away from the plate cylinder 1. It is also possible simply to stop the action of the jacks 6 and 7, in which case the movement of the rollers 4 and 5 away occurs simply by the action of their deadweight.

The device permitting the pivoting of the rollers 4 and 5 about the axis of the slide table 3 will now be described, with reference to both FIGS. 1 and 2. The inking rollers 4 and 5 consist of a cylinder of elastomer material arranged round a hollow metal cylinder 10 itself mounted rotatably through the intermediary of rolling-contact bearings 11, 12 on pieces 13, 14 mounted eccentrically on each of the ends of a shaft 15 fixed in rotation. The slide table 3 is supported through the intermediary of rolling-contact bearings 16, 17 on fixed bearings 18, 19. These fixed bearings 18, 19 comprise a cylindrical outer face 20, 21 arranged opposite the two ends 22, 23 of the shaft 15. Fixing pieces 26, 27 are fixed to these ends 22 and 23 of the shaft 15 through the intermediary of screws 24, 25. The pivoting joint device connecting the roller 5 to the axis of the slide table 3 is constructed by means of two metal bands 28, 29 bent in U shape, the central region of which partly surrounds, respectively, the cylindrical face 20 of the fixed bearing 18 and the cylindrical face 21 of the fixed bearing 19. The two ends of each of these two metal bands are fixed respectively to the fixing pieces 26 and 27 by means of screws 30, 31, 32 and 33. The screws 30 and 32 may serve simultaneously to connect the rods of the jacks 6 and 7 to the respective fixing pieces 26 and 27. The metal bands 28, 29 are fixed to the bearings 18 and 19 by means of screws 34, 35, 36 and 37, these screws being positioned on the bearings within the half-circumferential region in contact with the metal strips. If the width of the fixing pieces 26, 27 is substantially equal to the diameter of the cylindrical faces 20, 21 of the fixed bearings, the taut sides of the metal bands are substantially parallel, and the axis of the shaft 15 can therefore pivot virtually through an arc of a circle centered about the axis of the slide table 3.

The cylindrical faces 20, 21 of the fixed bearings are sufficiently long to receive the other metal bands 38, 39 intended for the fixing of the second inking roller 4. The fixing pieces 26, 27 are also provided sufficiently wide to be able to be used indiscriminately for the fixing of the metal bands 28, 29 or 38, 39.

The adjustment of the contact force between the roller 4 or 5 and the plate cylinder 1 can be performed by actuating adjusting screws 40, 41 coming into contact with the respective stops 8, 9. The adjustment of the contact force between the rollers 4, 5 and the slide table 3 may be performed by slackening the screws 42, 43 and applying a rotation of the eccentric bearings 13, 14 in order to adjust the distance between the axis of rotation of the rollers 4, 5 and the axis of the slide table 3.

We claim:

1. An improvement in printing presses in which at least one inking roller is placed in rolling contact with two other rollers one of which is a slide table, said inking roller being mounted pivotally about the axis of rotation of said slide table, wherein said inking roller (4, 5) is mounted rotatably about a shaft (15), said slide table (3) is supported by two fixed bearings (18, 19) each comprising a cylindrical outer face (20, 21), each end (22, 23) of said shaft (15) of said inking roller (4, 5) is connected to a corresponding one of said fixed bearings (18, 19) through the intermediary of a flexible metal band (28, 29) bent in U shape, the central region of said band partly surrounds the cylindrical face of said fixed bearing, being fixed thereto, and the two ends of which are fixed to the ends (22, 23) of said shaft (15) of said inking roller.

2. An improvement in printing presses as claimed in claim 1, wherein the ends of said metal bands (28, 29) are fixed to the ends of said shaft (15) through the intermediary of a fixing piece (26, 27), the width of said piece (26, 27) being substantially equal to the diameter of the cylindrical outer face (20, 21) of said fixed bearings, so that the sides of said metal bands are taut and substantially parallel.

3. An improvement in printing presses as claimed in claim 1 or 2, wherein said metal bands (28, 29) are fixed to the corresponding bearings (18, 19) by screws (34, 35, 36, 37) arranged on said bearings in the region of said cylindrical faces (20, 21), so that said cylindrical faces always remain in contact with the corresponding metal bands.

4. An improvement in printing presses as claimed in claim 1 or 2, wherein adjustment of the contact force between said inking roller (5) and said slide table (3) occurs by means of eccentric bearings (13, 14) which are mounted on said shaft (15) and on which said inking roller (5) is mounted, the adjustment being obtained by rotating said eccentric bearings (13, 14) about said shaft (15), thus varying the distance between the axis of rotation of said inking roller (5) and the axis of said slide table (3).

* * * * *